UNITED STATES PATENT OFFICE.

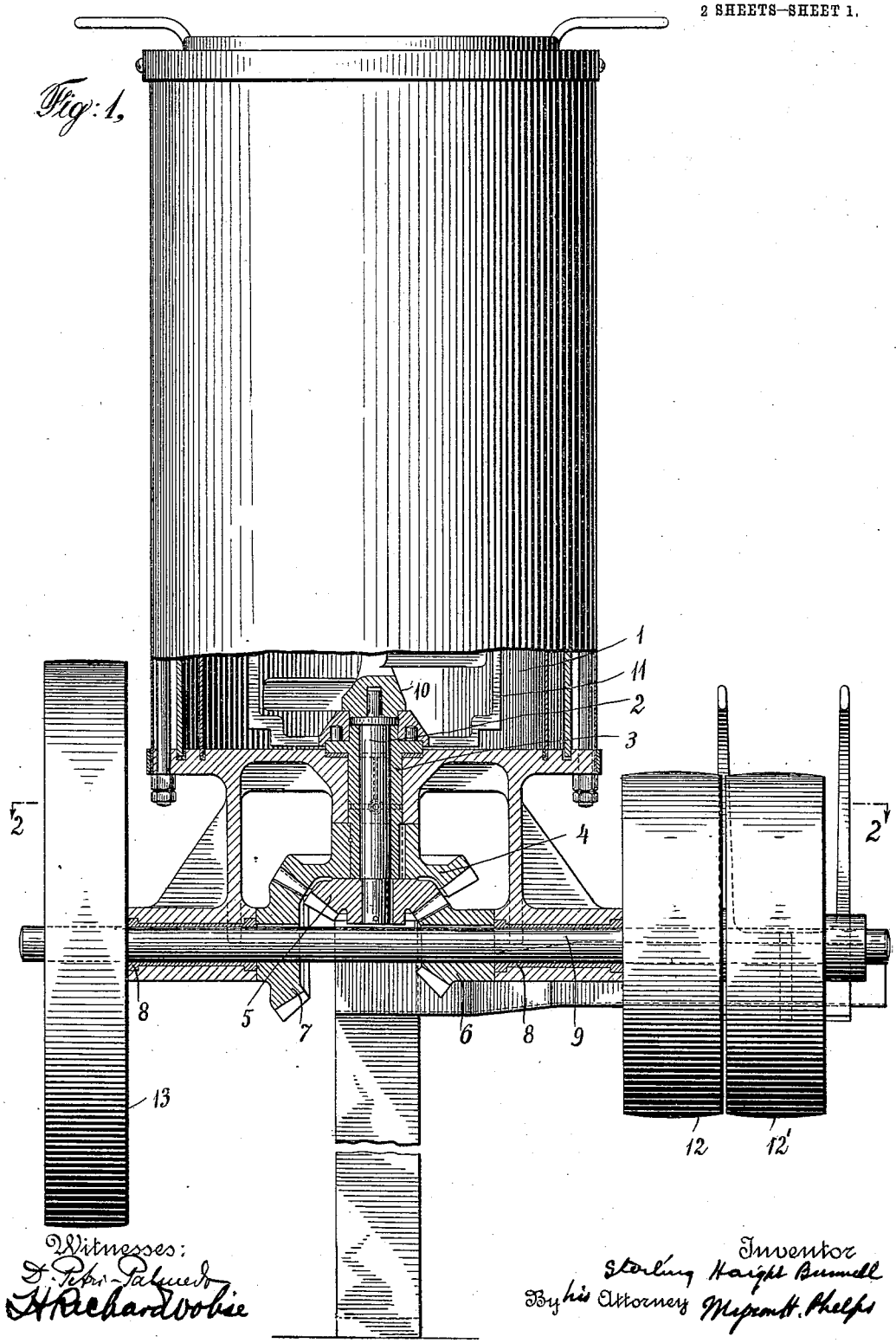

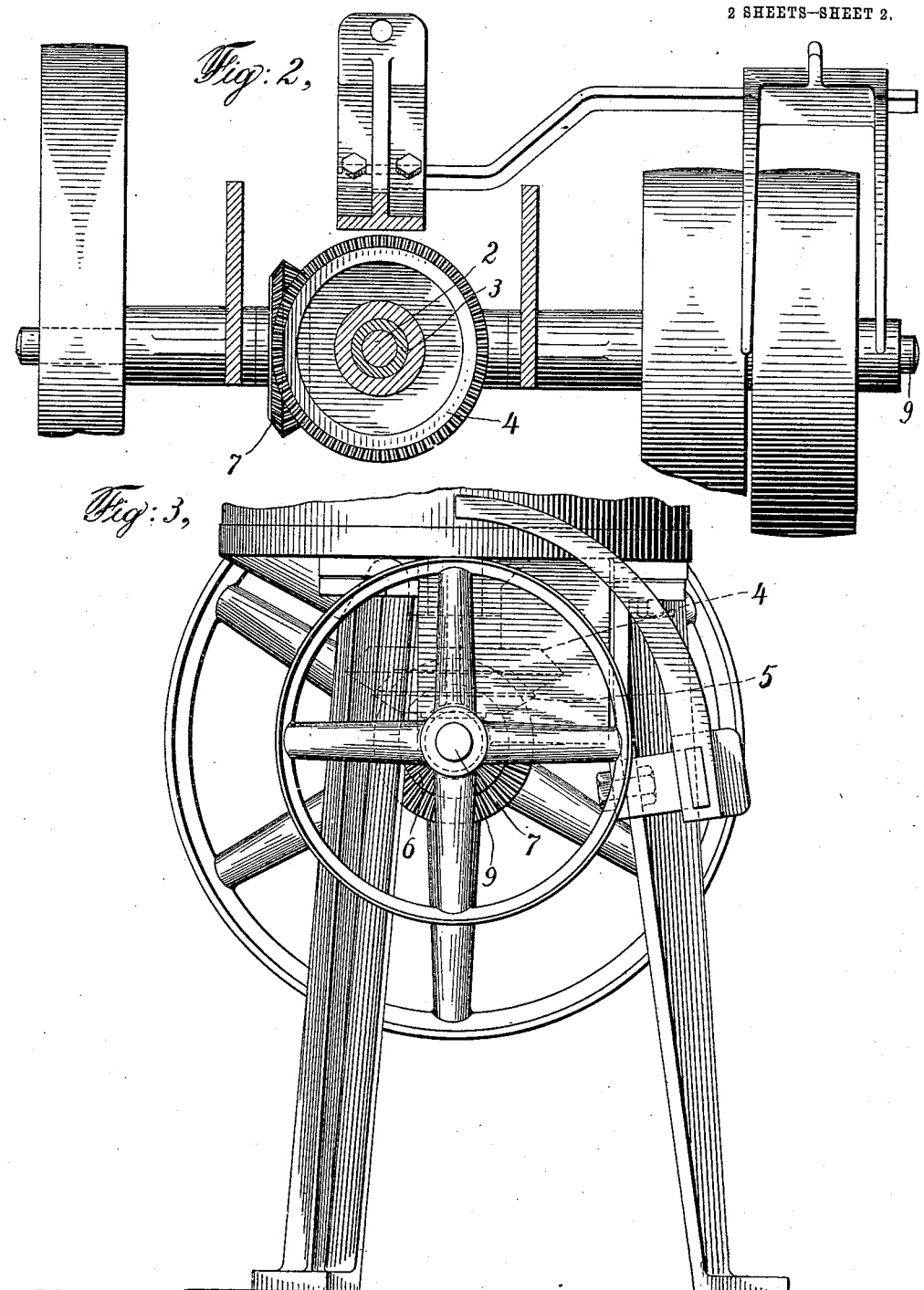

STERLING HAIGHT BUNNELL, OF NEW YORK, N. Y.

MIXING OR ICE-CREAM-FREEZING MACHINERY.

991,604.  Specification of Letters Patent.  Patented May 9, 1911.

Application filed March 1, 1909. Serial No. 480,789.

*To all whom it may concern:*

Be it known that I, STERLING H. BUNNELL, a citizen of the United States, residing in the city, county, and State of New York, have invented certain new and useful Improvements in Mixing or Ice-Cream-Freezing Machinery, of which the following is a specification.

My invention relates to those types of mixers or freezers having two sets of dashers or beaters driven respectively by two concentric shafts revolving in opposite directions. Hitherto, such mixers or freezers have been operated by gearing so placed and arranged that the driving shaft does not pass across the machine, but has one end supported therein and an exterior bearing. This construction requires a considerable extension of the shaft sidewise of the machine, which is undesirable.

My present invention consists in so mounting the driving shaft and arranging the gears that the driving shaft may pass across the machine and be entirely supported within and by the machine itself. Compactness and convenience as compared with prior constructions are thus secured.

Figure 1 is a side view, partly in section, of my invention. Fig. 2 is a plan view of part of the driving gears, on the sectional line 22 (Fig. 1), looking from above. Fig. 3 is a side elevation of the machine.

The mixing or freezing chamber 1 has within it two frames 10 and 11 carrying the beater or dasher blades. These two frames are connected respectively with the counter shafts 2 and 3, shaft 3 being hollow and concentric with shaft 2, each of said shafts having lateral flanges or collars adjacent their upper ends for maintaining the same in position in a vertical direction, as illustrated in Fig. 1 of the drawings. To these counter shafts are keyed the bevel pinions 4 and 5. The main driving shaft 9 is mounted in two brackets 8, one on either side of the center of the machine. Keyed to the driving shaft are pinions 6 and 7, meshing with the pinions 4 and 5 and placed symmetrically with reference to the counter shafts, that is, one on each side of the same, so that the counter shafts will be driven in opposite directions. The driving and loose pulleys 12 and 12' and the fly wheel 13 are placed immediately adjacent to the brackets.

While my improvements have been specially designed for an ice cream freezing machine, it is obvious they may be applied to a mixing machine in which no change of temperature is contemplated.

What I claim is—

In an ice cream freezer or similar device, a main casing, a lower head or base to which said casing is fixed, bearings on each side of the center of said base, a continuous transverse driving shaft passing through said bearings, two beveled gears fixed to said shaft between said bearings, a power-driven wheel carried on one end of said shaft, a flywheel on the opposite end of said shaft, concentric shafts extending through said base and provided with lateral flanges for holding said shafts longitudinally in position, means carried by the ends of said concentric shafts adapted respectively to engage two rotatable beaters within said casing, and adjacent beveled gears fixed to the outer ends of said concentric shafts and meshing respectively with said first-mentioned gears.

In witness whereof, I have signed my name in the presence of two witnesses.

STERLING HAIGHT BUNNELL.

Witnesses:
 GEO. H. HULL,
 R. R. Row.

Copies of this patent may be obtained for five cents each, by addressing the "Commissioner of Patents, Washington, D. C."